W. STERNBERG.

Cheese-Hoop.

No. 8,832. Reissued Aug. 5, 1879.

WITNESSES

John Kellis.

Frank J. Masi.

INVENTOR

William Sternberg, by E. W. Anderson.

ATTORNEY

THE NORRIS PETERS CO., PHOTO-LITHO., WASHINGTON, D. C.

UNITED STATES PATENT OFFICE.

WILLIAM STERNBERG, OF CICERO, ASSIGNOR TO LEMAN W. TYLER, OF THERESA, NEW YORK.

IMPROVEMENT IN CHEESE-HOOPS.

Specification forming part of Letters Patent No. 112,977, dated March 21, 1871; Reissue No. 8,832, dated August 5, 1879; application filed May 24, 1879.

*To all whom it may concern:*

Be it known that I, WILLIAM STERNBERG, of Cicero, in the county of Onondaga and State of New York, have invented a new and useful Improvement in Cheese-Hoops; and I do hereby declare that the following is a full, clear, and exact description thereof, which will enable others to make and use the same, reference being had to the accompanying drawings, forming a part of this specification, in which—

Figure 1:
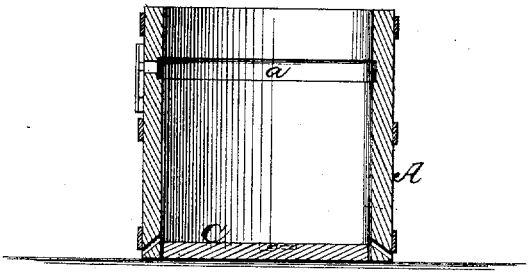
Figure 2:
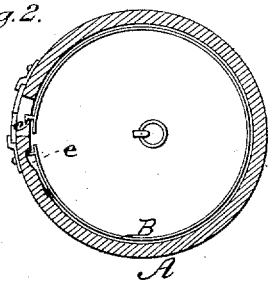
Figure 4:
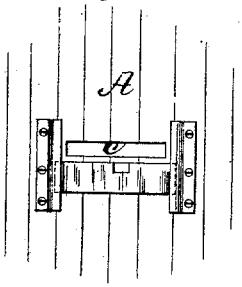
Figure 3:
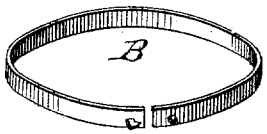

Figure 1 is a vertical central section of the hoop. Fig. 2 is a horizontal section of the same, and Figs. 3 and 4 are details.

Similar letters of reference indicate like parts in the several figures.

In cheese-making the bandage is ordinarily applied after first pressing the cheese in a sack or press-cloth, and when the cheese has become firm enough to handle, removing it from the hoop and taking off the press-cloth. The bandage is then applied and the cheese enveloped therein again placed in the hoop and submitted to pressure.

The object of this invention is to complete the process in one operation, and obviate the necessity of removing the cheese from the hoop to place the bandage upon it, thereby making an important saving of labor, as hereinafter more fully explained.

In the accompanying drawings, the letter A designates the cheese-hoop, which is provided with an annular groove or depression, *a*, in its upper portion.

B represents an expansible ring or band for the purpose of holding the upper edge of the bandage between said ring or band and the hoop while being filled with curd and during the process of pressing, this ring or band being made to occupy the groove or depression *a*, so as not to interfere with the follower.

C indicates the bottom about which the hoop is placed.

The bandage is placed in the hoop, and its upper edge is held in position by expanding the ring or band B into the groove or depression, so as to hold the bandage between said ring or band and the hoop. This may be done by inserting the nib *b*, Fig. 3, in a notch, *e*, Fig. 2, in the hoop, and then inserting a small lever through a hole in the hoop, as shown at *c*, and prying the ring or band open.

When the bandage has been secured as described, the bottom C is pushed down, and this smooths it out against the wall of the hoop. The lower cap of cloth is then placed on the bottom C, and the upper cap is forced down before the follower, and the operation of pressing the cheese is greatly facilitated by the means stated, as it is completed in the first pressing, and without having to replace the cheese in the hoop after it has been removed.

What I claim, and desire to secure by Letters Patent, is—

1. An expansible ring or band, in connection with the upper part of a cheese-hoop, to hold the upper edge of the bandage while being filled with curd and during the process of pressing, substantially as specified.

2. The combination of the expansible ring or band and the cheese-hoop grooved or depressed sufficiently to receive said ring or band, so that it will not interfere with the follower, substantially as specified.

In testimony that I claim the above I have hereunto signed my name this 21st day of May, 1879.

WILLIAM STERNBERG.

Witnesses:
HENRY CROWNHART,
CHAS. CROWNHART.